US010531153B2

(12) United States Patent
Bostick et al.

(10) Patent No.: US 10,531,153 B2
(45) Date of Patent: Jan. 7, 2020

(54) COGNITIVE IMAGE OBSTRUCTION

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/443,685

(22) Filed: Feb. 27, 2017

(65) Prior Publication Data
US 2018/0249213 A1    Aug. 30, 2018

(51) Int. Cl.
*H04N 21/454*    (2011.01)
*H04N 21/44*    (2011.01)
*H04N 21/4223*    (2011.01)
*H04N 21/442*    (2011.01)
*H04N 21/84*    (2011.01)

(52) U.S. Cl.
CPC ..... *H04N 21/4542* (2013.01); *H04N 21/4223* (2013.01); *H04N 21/44008* (2013.01); *H04N 21/44218* (2013.01); *H04N 21/84* (2013.01)

(58) Field of Classification Search
CPC ......... H04N 21/4542; H04N 21/44218; H04N 21/4223; H04N 21/44008; H04N 21/84; H04N 21/4532
See application file for complete search history.

(56) References Cited

U.S. PATENT DOCUMENTS 7,134,130 B1 * 11/2006 Thomas ................. H04N 7/163
725/25
9,602,871 B1 * 3/2017 Holcomb ........... H04N 21/4542
(Continued)

FOREIGN PATENT DOCUMENTS

EP    2725814    4/2014
EP    2849454    3/2015

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Junior O Mendoza
(74) *Attorney, Agent, or Firm* — Heslin Rothenberg Farley & Mesiti P.C.; James Nock, Esq.

(57) ABSTRACT

A method, computer program product, and system for obscuring inappropriate content in video media includes a processor(s) communicating with one or more sensors, to identify individuals within a designated area that is within a visual range of a monitor. The processor(s) obtains viewing preferences for each of the identified individuals; the preferences designate parameters for viewing media that includes content within pre-defined categories. The processor(s) consolidates the viewing preferences of the identified individuals to generate a set of guidelines for displaying content in the designated area. The processor(s) analyzes video media for display on the monitor to locate content in the categories. The processor(s) applies the set of guidelines to the content and determines that a portion of the content should be obscured when the video media is displayed on the monitor. The processor(s) displays the video media on the monitor, obscuring the portion of the content.

19 Claims, 6 Drawing Sheets

(56) References Cited

U.S. PATENT DOCUMENTS

| | | | | |
|---|---|---|---|---|
| 9,621,953 B1* | 4/2017 | Holcomb | ............ | H04N 21/4542 |
| 2009/0222849 A1* | 9/2009 | Peters | ................ | H04N 21/4147 |
| | | | | 725/28 |
| 2011/0154385 A1* | 6/2011 | Price | ...................... | H04H 60/45 |
| | | | | 725/12 |
| 2011/0161999 A1* | 6/2011 | Klappert | ............ | H04N 21/4307 |
| | | | | 725/25 |
| 2012/0167123 A1* | 6/2012 | Gavita | ................ | H04N 21/4223 |
| | | | | 725/10 |
| 2014/0150009 A1* | 5/2014 | Sharma | .............. | H04N 21/4126 |
| | | | | 725/28 |
| 2015/0348166 A1* | 12/2015 | Trivedi | .............. | G06Q 30/0631 |
| | | | | 705/26.7 |
| 2016/0112760 A1* | 4/2016 | Kosseifi | ........... | H04N 21/42203 |
| | | | | 725/28 |

\* cited by examiner

US 10,531,153 B2

COGNITIVE IMAGE OBSTRUCTION

BACKGROUND

The invention relates to controlling the displaying of visual media on a viewer, such as a monitor.

SUMMARY

Shortcomings of the prior art are overcome and additional advantages are provided through the provision of a method for obscuring inappropriate content in video media. The method includes, for instance: identifying, by one or more processors, by communicating over a communications network with one or more sensors, individuals within a designated area, wherein the designated area in within a visual range of a monitor, wherein the monitor is communicatively coupled to the one or more processors. The method further includes obtaining, by the one or more processors, viewing preferences for each of the identified individuals, wherein the viewing preferences designate parameters for viewing media comprising content within one or more pre-defined categories. The method further includes consolidating, by the one or more processors, the viewing preferences of the identified individuals to generate a set of guidelines for displaying content in the designated area to all of the identified individuals, wherein the set of guidelines comprises a parameter for each of the pre-defined categories that is the narrowest parameter for a pre-defined category among the parameters for viewing media content of the identified individuals. The method further includes analyzing, by the one or more processors, video media for display on the monitor to locate content in the pre-defined categories. The method further includes applying, by the one or more processors, the set of guidelines to the content in the pre-defined categories and determining, based on the set of guidelines, that a portion of the content should be obscured when the video media is displayed on the monitor. The method further includes displaying, by the one or more processors, the video media on the monitor, wherein the displaying comprises obscuring the portion of the content such that the portion of the content is not viewable on the monitor.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
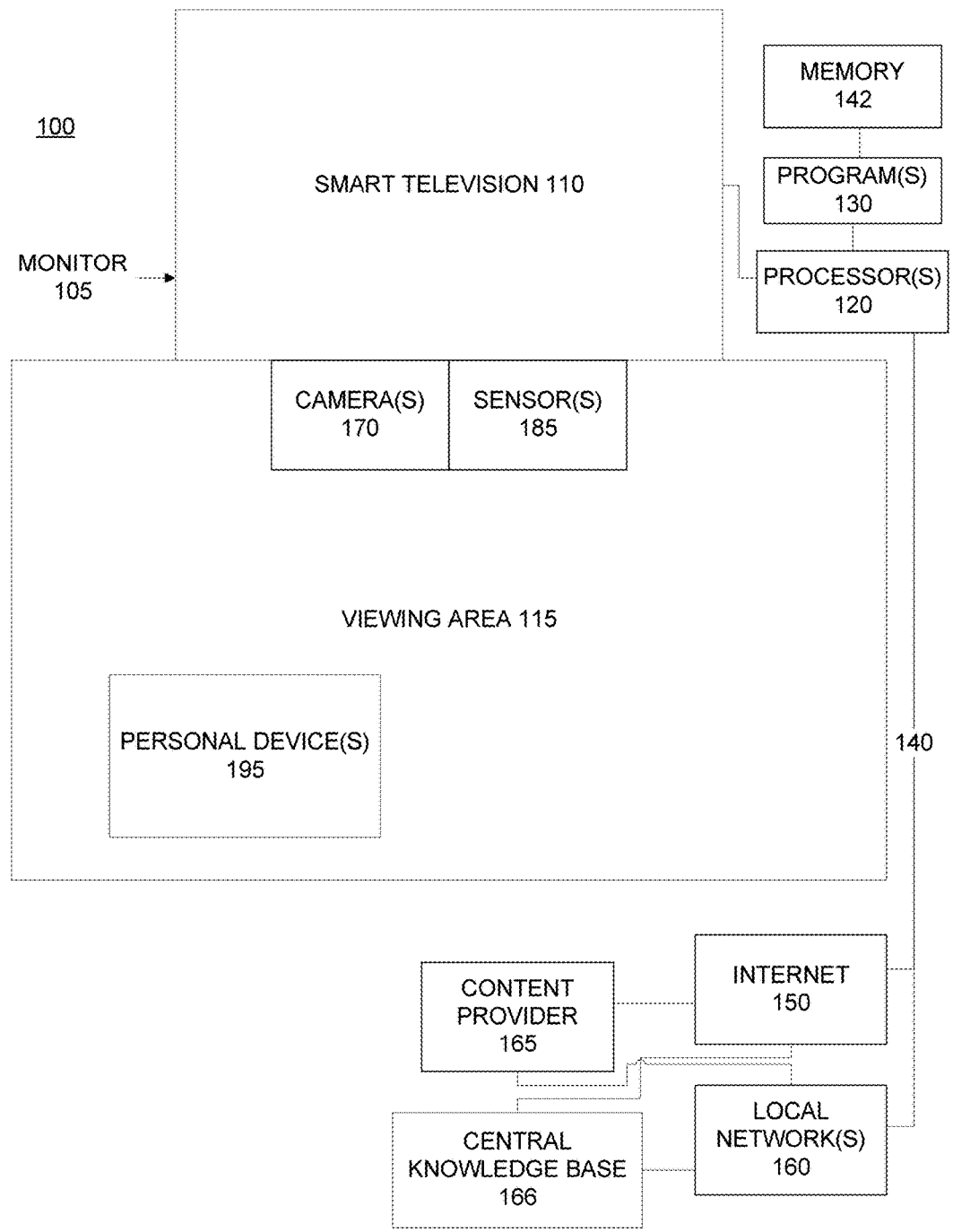
FIG. 1 depicts elements of a technical architecture into which aspects of an embodiments of the present invention are implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
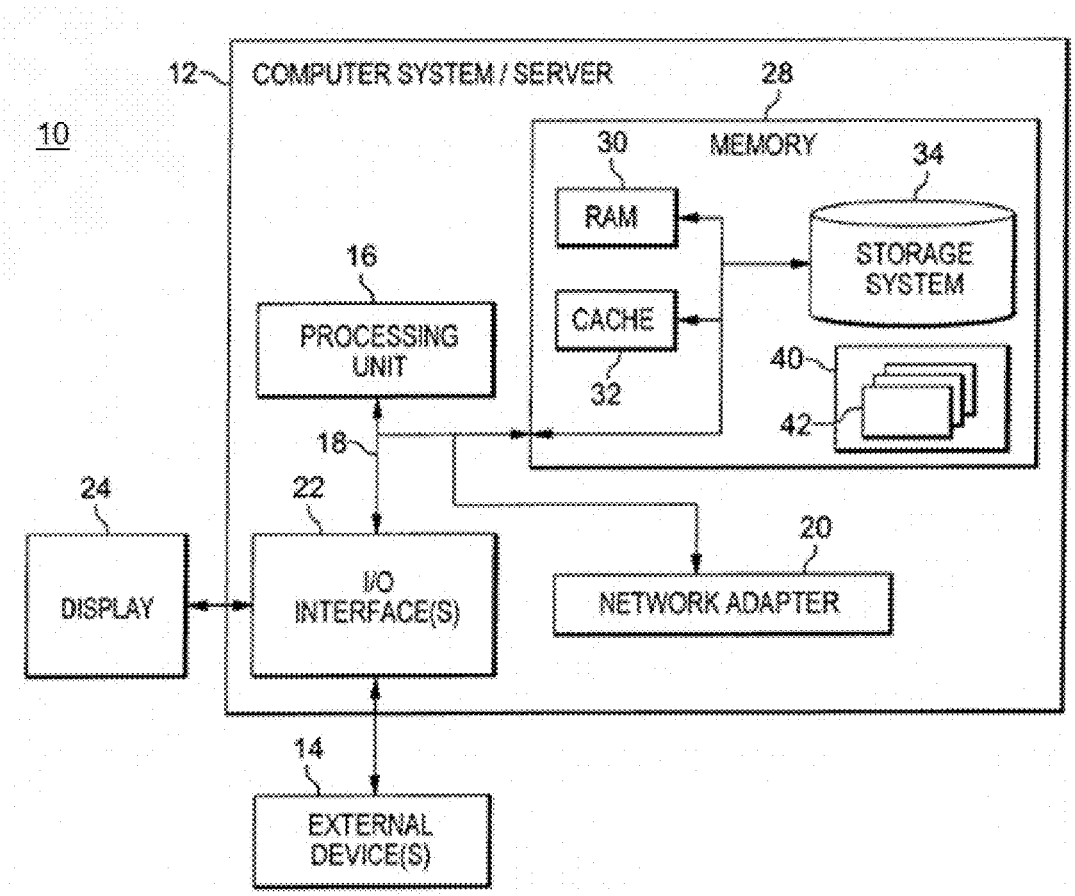
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

While watching visual media, including but not limited to, a television program, a movie or a type of streamed programming, sometimes the content displayed on one or more portions of the image on the screen may not be appropriate for everyone who is watching the media. To address this issue, various warnings are provided at different points in a program the current set of users. Different viewers have different comfort levels regarding content. These warnings currently indicate certain types of content that will be present in a media (e.g., adult situations, violence, and/or inappropriate language) and upon seeing the warnings, viewers may decide who the audience for the media should include. An existing technology that can be utilized to limit an audience for a given television program is a v-chip, a computer chip installed in a television receiver that can be programmed by the user to block or scramble material containing a special code in its signal indicating that it is deemed of an adult nature.

Embodiments of the present invention provide a granular, viewer-specific, and automatic approach to addressing content in visual media that may be inappropriate for one or more viewers in an audience watching the media, by automatically blurring portions of an image that meet defined viewer-specific criteria, based on the presence of that viewer within a viewing vicinity. Unlike existing systems which limit media entirely based on indicators that categorize the entirety of a program, movie, or other form of visual media, aspects of certain embodiments of the present invention can blur or otherwise visually obscure only the objectionable content, in a flexible and granular manner, that addresses a variety of specific user preference related and user defined criteria.

Embodiments of the present invention can be utilized to address specific content-related concerns because from a granularity viewpoint, different users have different requirements and have different conditions for what content may not be appropriate or desired. For example, some parents may not want themselves and/or their children to view content that contains images that include or suggest domestic violence. However, an instance of this domestic violence may only appear on a portion of the screen in one scene of a movie. Embodiments of the present invention can visually obscure just the portion of the screen that includes this incident, during this incident, without affected the remainder of the screen or the remainder of the broadcast. Some viewers may not wish to see verbal or physical intimidation or particular types of violence or aggression. Embodiments of the present invention can obscure only the portion of the screen that includes an incident fitting this description during the duration of the incident, only. Some individuals may find gross-out humor objectionable while others are amused by it. These preferences may all be temporary or permanent for each potential viewer. For example, an individual with a stomach flu may be less interested in watching graphic gross-out humor until he or she has recovered, at which point, the antics may be more amusing. Thus, an embodiment of the present invention may adjust to obscure scenes that include this type of humor during a pre-defined duration, based on the presence of this viewer in a viewing area. Embodiments of the present invention could also be utilized to block live news information, which is sometimes shown at the bottom of a screen, for example, when a viewer would prefer to receive this information at a later time. For example, a viewer may be excited about experiencing a live sports event play-by-play at a later time, and the news ticker at the bottom of the screen would prematurely reveal the outcome to the viewer.

Aspects of various embodiments of the present invention provide technological advantages over existing methods of addressing content deemed inappropriate for a specific audience. For example, rather than categorize an entire program's content and utilize program code to determine whether to exhibit this program on a monitor, program code in embodiments of the present invention determines the content of specific scenes, and of specific portions of the images in specific scenes, and determine in real-time whether or not to show granular portions of a given scene based on determining who is in the room and parameters related to those individuals, including but not limited to, historical preferences, current preferences, and/or temporal circumstance that affect preferences. Additionally, in embodiments of the present invention, the program code executing on one or more processing circuits adjusts displayed content in real-time as the makeup of the audience in a viewing area changes. The program code in certain embodiments also determines and enacts the best approach for obscuring inappropriate content, including but not limited to, blurring a portion of a screen/monitor, substituting video in place of the content, displaying a generic images on a full screen in place of the video (e.g., "please stand by") and/or skipping the content and resuming the media at a later point. While obscuring the content, program code in an embodiment of the present invention keeps track of the timing of the substitute content so as not to affect the runtime of the media.

Program code in embodiments of the present invention can make dynamic determinations regarding obscuring content based on temporal conditions of a viewer in an audience as well as historical data related to a view. For example, based on obtaining information related to the health of an individual, the program code may obscure content that would prove problematic for the unwell viewer to watch. In another aspect, the program code can reference historical data relating to a given viewer's reaction to certain types of content to determine whether content is appropriate for that viewer. As will be discussed in reference to FIG. 1, an embodiment of the present invention may utilize smart television or video devices that are equipped with cameras, image processing, and possible microphones to collect audio data, in order to make determinations related to a given viewer and what content should or should not be relayed to that viewer.

In an embodiment of the present invention, the program code may solicit input from an administrator to determine whether content should be obscured. For example, upon making a determination that certain types of content should be obscured when a given user is in a viewing area, the program code may solicit a confirmation of this determination from the administrator. Additionally, embodiments of the present invention may include an override capability that enables an administrator to rewind previously obscured content without the obscuring by the program code.

Embodiments of the present invention may provide different viewing experiences to different users. In the case where a user is in the viewing area and based on that user's presence certain content should be obscured, the program code may provide the full content to additional users in the viewing area without this limitation on personal devices. Personal devices may include, but are not limited to, smartphones and tablets.

FIG. 1 depicts a technical environment 100 of an embodiment of the present invention. As discussed earlier, an embodiment of the present invention may include a smart television 110. As understood by one of skill in the art, a smart television 100, which is also referred to as a connected television or a hybrid television, is a television set with integrated Internet and interactive, e.g., Web 2.0, features. In general, the term smart television refers to a television that represents a technological convergence between computers (e.g., computing node 10, FIG. 4), (generally flat screen) television sets, and set-top boxes. In addition to the features of television sets and set-top boxes provided through traditional broadcasting media, a smart television 110 can also provide Internet TV, online interactive media, over-the-top content (OTT), on-demand streaming media, and home networking access. The smart television 110 includes a monitor 105 upon which content is displayed to viewers within a viewing area 115.

As explained below, the viewing 115 area may be defined by cameras 170 and/or sensors 185 or may be a pre-defined geographical area based on known characteristics of the monitor 105, specifically, a known range from where the monitor 105 is viewable in a geographic space.

In an embodiment of the present invention, the smart television either includes or is communicatively coupled with one or more processors 120 executing one or more programs 130. The one or more processors 120 communicate over a communications connection 140 over which the one or more processors can access both the Internet 150 as well as one or more a local networks 160, which may be wired and/or wireless. Utilizing an embodiment of the present invention, users can configure the one or more programs 130, for example, through an interface, including but not limited to, a touchscreen integrated into the monitor 105. A user may utilize an interface to configure the one or more programs 130 to obscure certain types of content when displaying this content of the monitor 105, while enabling other types of content to be displayed on the monitor 105 without any changes.

The technical environment 100 in an embodiment of the present invention also includes image capture devices, such as cameras 170. In an embodiment of the present invention, the range of the image capture devices define the viewing area 115 in which the program code can determine who is viewing content on the monitor 105. In an embodiment of the present invention, program code in the one or more programs 130 executed by the one or more processors 120 processes the images captured by the cameras 170 to identify who is in the viewing area. The cameras 170 may be distributed in different geographical locations in a physical area proximate to the monitor 105 and communicatively coupled to the smart television 110 over a network and/or the cameras 170 may be integrated into the smart television 110. In an embodiment of the present invention, the smart television 110 will be integrated with a capability (via executing one or more programs) to determine who is in the viewing area 115. In another embodiment of the present invention, one or more programs of a content provider 165 for the content displayed on the monitor 105 determines who is in the viewing area 115.

In an embodiment of the present invention, one or more programs of the content provider 165 or local to the smart television 110, may determine who is in a viewing area 115 by communicating with personal devices 195 associated with individuals within a pre-determined geographic vicinity of the monitor 105. These personal devices may include, but are not limited to smartwatches, phone devices, tablets, etc. Certain of these devices may monitor biometric data of users and provide this biometric data to the one or more programs 130, which can utilize biometric indications to determine whether certain content is appropriate for the monitored viewers. The one or more programs may also use biometric data in order to determine whether a given user is within the viewing area 115, as opposed to the user's device being abandoned in the area without the viewer. In an embodiment of the present invention, upon entry into the viewing area 115, a personal device 195, such smartwatch worn by a viewer, may be configured to automatically indicate the presence of the user to the one or more programs 120, for example, by pairing with the smart television 110.

In an embodiment of the present invention, the one or more programs 130 analyze video content in order to determine where adjustments could be made for certain users. For example, beyond the general designations, such as "TV-MA" or "PG-13," there are between about ten to about twenty classifications that classifies content (including on a granular level) indicate the presence of certain types of events in the content. These classifications may include, but are not limited to adult situations, adult content, graphic visual content, unpalatable situations, negative behaviors, challenging social situations, etc. In an embodiment of the present invention, the one or more programs 130 identify the portions of the content, including an area of the monitor 105 when the content is displayed, that earned the designation and tags just the portion of the screen (e.g., pixels) in the relevant frames that include this issue.

In an embodiment of the present invention, the one or more programs 130 provide real-time contextual analysis the results of which the one or more programs 130 utilize toe obscure content identified as inappropriate for viewers in the viewing area 105. Thus, the one or more programs 130 determine what is happening on the monitor 105 and automatically detect certain issues that may pose. For example, in an embodiment of the present invention one or more contextual detection programs may effectively dissect video content to determine whether illness, mature content, an animal attack, etc. is on screen at a given time.

In an embodiment of the present invention, one or more programs determine what content is inappropriate for each viewer and if the viewer is located in the viewing area 115, the one or more programs can adjust the display of the content on the monitor 105 to obscure inappropriate content. For example, one or more programs 130 may obtain and analyze multiple streams of data from various sources to determine the preference of a given viewer, including temporal preferences. The program may utilize Natural Language Processing (NLP) algorithms to make these determinations. In an embodiment of the present invention, the user can configure which content the one or more programs 130 will analyze when determining which content to obscure for each user. In an embodiment of the present invention, the one or more programs 130 may determine, based on analyzing one or more data stream, a temporary viewing parameter should be set for a given viewer. The one or more programs 130 will set this parameter. For example, if applying an NLP algorithm to a data stream from a social media site enables the one or more programs 130 to determine that an individual in the viewing area 115 has recently suffered a loss, the one or more programs may obscure any scenes that relate to mortality permanently (i.e., until the setting is changed), or, for a pre-defined period of time. In an embodiment of the present invention, the user may configure the pre-defined period of time, based on the type of circumstance the one or more programs determines exists based on the data stream.

In an embodiment of the present invention, the program code constructs viewing parameters for each user in a viewing area 115 by identifying the users and obtaining and analyzing information available about each user from various sources, including social media. The NLP algorithms utilized in embodiments of the present invention classify the sentiments contained in verbiage found in order to set parameters. For example, in an embodiment of the present invention, when the program code obtains data indicating comments such as "get well soon" and "sorry to have the flu" on a user's social media page, the program code may set a parameters for obscuring any graphic images related to illness. In addition, users may configure certain parameters through an interface. Once the one or more programs have set profiles for the individuals in the viewing area 115, the program code saves these profiles in a memory accessible to the one or more programs 120. When the program code determines that a certain parameters may be temporary, for example, a mention of an illness on a social media site is identified by the program code, the program code may generate additional database columns to store temporary parameters related to a viewing preference based on this information.

Table 1 below is an example of certain columns in a database table that could be utilized by the one or more programs 120 to set and store viewing parameters related to users such that the one or more programs can obscure video content displayed on the monitor 105 when the given user is within the viewing area 115. Table 1 is used to illustrate how an embodiment of the present invention determines, stores, and applies preferences or parameters in order to obscure content of a user-specific and granular basis. The categories utilized in this example are meant to illustrate some embodiments of the present invention and are not indicative of the totality of categories available for use in embodiments of the present invention.

TABLE 1

| User | Category | Permanently Obscure | Temporarily Obscure |
|---|---|---|---|
| Peter | Graphic Violence | N | Feb. 8, 2017 |
| Peter | Adult Situations | N | |
| Peter | Graphic Illness | N | Feb. 8, 2017 |
| Peter | Verbal or Physical Intimidation | N | |
| Peter | Animal Violence | N | |
| Mary | Graphic Violence | N | Feb. 8, 2017 |
| Mary | Adult Situations | N | |
| Mary | Graphic Illness | N | Feb. 8, 2017 |
| Mary | Verbal or Physical Intimidation | Y (blur) | |
| Mary | Animal Violence | N | |
| Bob | Graphic Violence | Y (blur) | |
| Bob | Adult Situations | N | |
| Bob | Graphic Illness | N | |
| Bob | Verbal or Physical Intimidation | N | |
| Bob | Animal Violence | Y (blur) | |
| Jennifer | Graphic Violence | Y (blur) | |
| Jennifer | Adult Situations | Y (blur) | |
| Jennifer | Graphic Illness | N | |
| Jennifer | Verbal or Physical Intimidation | N | Feb. 8, 2017 |
| Jennifer | Animal Violence | N | |
| New User | Graphic Violence | Y (blur) | |
| New User | Adult Situations | N | |
| New User | Graphic Illness | N | |
| New User | Verbal or Physical Intimidation | N | |
| New User | Animal Violence | N | |

In an embodiment of the present invention, the program code has determined that users Peter, Mary, Bob, Jennifer and an unidentified user, noted in the table as "New User" are present in the viewing area 115. In this example, Peter and Mary, adults, are parents to 7-year-old Jennifer and teen-aged Bob. The one or more programs 120 monitored the viewing habits of these individuals and accessed data feeds to find temporal issues that might affect viewer preferences. The program code classified different types of content into five (5) categories, which is a non-limiting example provided for illustrative purposes. Thus, for each user, the program code stored parameters for obscuring content on both a permanent and temporary basis. In the case of the latter, the program code saved an expiration date for this preference. In this example, the one or more programs 120 utilized social media data to determine that Peter and Mary have a stomach flu and Jennifer was recently intimidated verbally by a classmate. Based on these temporal situations, the program code determined that Peter and Mary should not be exposed to either graphic violence or graphic illness and Jennifer should not be exposed to portions of scenes including verbal or physical intimidation.

Figure 2:
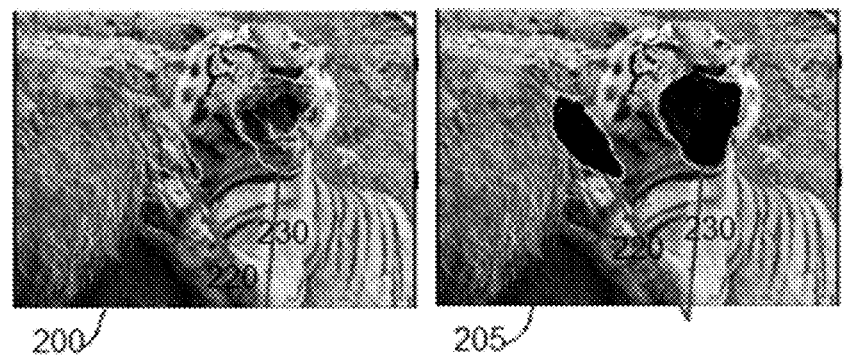
FIG. 2 depicts certain aspects of an embodiment of the present invention.

Based on Table 1, the one or more programs 120 will obscure content viewed by Bob that includes animal violence. FIG. 2 illustrates one example of how the one or more programs 120 (FIG. 1) render a scene that includes an element of animal violence on the monitor 105 (FIG. 1). The image 200 in FIG. 2 is a frame of video content that the one or more programs determine include a first portion 220 and a second portion 230 that both contain animal violence. When displaying this image in the monitor 105 FIG. 1), which is viewable by Bob, the one or more programs obscures these portions of the image 200, for example, by replacing the problematic elements with solid blocks, as seen in obscured image 205. In an embodiment of the present invention, because the remaining viewers in the viewing area 105 do not have the animal violence preference of Bob, the program code may display the unobscured image 200 with the first portion 220 and the second portion 230 unobscured, on personal devices 195 (FIG. 1) of viewers without this preference.

As illustrated in Table 1, in an embodiment of the present invention, as the one or more programs 130 determine the preferences of individual viewers, the program code saves (and updates) those preferences a memory. In the embodiment of FIG. 1, the memory is a central knowledge base 166, which may be localized to a specific smart television 110 or may be accessible to various other video display systems over a communications connection, including over the Internet, and/or by housing this knowledge base in a shared computing node of a multi-user system, such as a cloud computing environment. In an embodiment of the present invention, the knowledge base 166 may contain pictures of users with preferences, so that one or more programs 120 can match a user in the viewing area 115 with stored preferences. In this embodiment, the one or more programs 120 obtain images of the users in the viewing area 115 from the image capture devices, such as cameras 170, in the technical environment 100. The one or more programs 120 match the images captured with the stored images to locate the preferences for each viewer.

Figure 3:
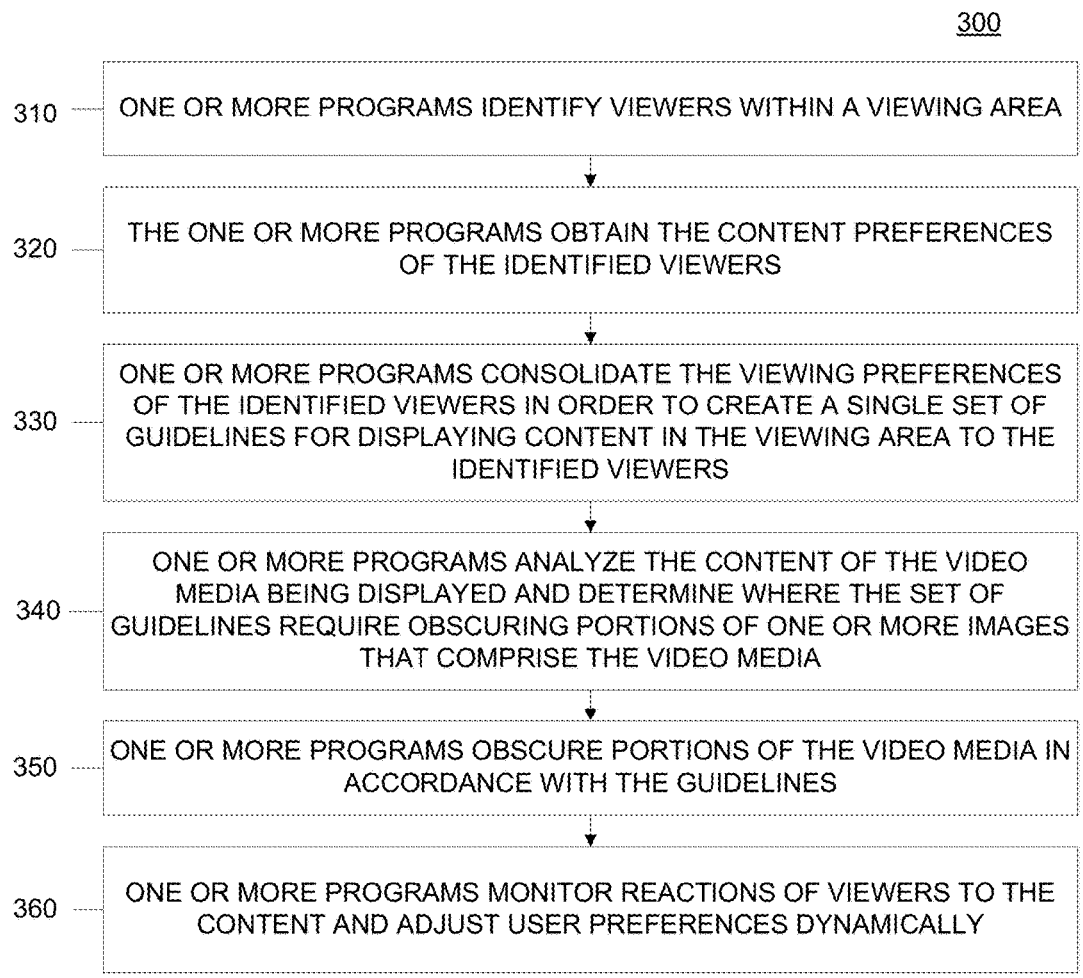
FIG. 3 is a workflow illustrating certain aspects of an embodiment of the present invention.

FIG. 3 is a workflow 300 that illustrates aspects of an embodiment of the present invention. In an embodiment of the present invention, one or more programs identify viewers within a viewing area (310). In an embodiment of the present invention, the one or more programs receive this information from personal computing devices associated with the users. These devices may include smart watches. In the case of the smart watches, the one or more programs may utilize biometric data to determine that the devices are in the possession of users, rather than being within the viewing area without a user. In another embodiment of the present invention, the program code may access image data from cameras and/or sensors within the viewing area to determine basic information about users in the area or may match the images captured to images of specific users retained in a database, including but not limited to, a central knowledge base. The one or more programs may also identify users within the viewing area by receiving data via user input, identifying users and/or setting preferences for the users, manually.

Based on identifying the users, the one or more programs obtain the content preferences of the viewers (320). The program code may obtain these preferences from a database, from the aforementioned user entry, and/or from applying NLP algorithms to data feeds obtained from websites, including social media sites. For each identified user, the one or more programs determine what types of content should be obscured when displaying on a primary monitor viewable to the identified users in the viewing area. In an embodiment of the present invention, the program code determines both permanent and temporary limitations of what each user can view (or should view).

The one or more programs consolidate the viewing preferences of the identified users in order to create a single set of guidelines for displaying content in the viewing area to the group of users (330). In producing the consolidated guidelines, the program code selects the strictest limitation for each category. For example, in a room containing Peter, Mary, Bob, Jennifer, and New User, as illustrated, in Table 1, a consolidated set of guidelines would require obscuring content that contains graphic violence (based on the preferences of Peter, Mary, Bob, Jennifer, New User), adult situations (based on the preferences of Jennifer and New User), graphic illness (based on the preferences of Peter and Mary, verbal or physical intimidation (based in the preferences of Mary and Jennifer, and animal violence (based on the preferences of Bob). In an embodiment of the present invention, the program code continuously monitors the viewers in the viewing area and recalculates the set of guidelines based on changes in the makeup of the audience. For example, if the one or more programs (utilizing data from devices belonging to users in the viewing area and/or imaging devices in the viewing area) determined that Bob has left the area, the one or more programs will no longer obscure (e.g., blur) content that includes animal violence because the remainder of the individuals in the room do not have preferences to obscure this type of content.

In an embodiment of the present invention, the one or more programs analyze the content of the video media being displayed and determine where the set of guidelines require obscuring of portions of one or more images that comprise the video media (340). In an embodiment of the present invention, the program code obtains the video content from providers and the content includes metadata that indicates where portions of the content include elements within the defined preference categories. For example, in the event that the categories on Table 1 comprise defined preference categories, the metadata would include information identifying portions in video media that include items that would fall into these categories. In an embodiment of the present invention, the program code tags portions of images that comprise the content with tags that coordinate with categories. The program code may tag coordinates on a frame as well as the frame that contains the coordinate tag so that the one or more programs can identify this portion of the video content quickly when playing the content and make adjustments based on the guidelines.

The one or more programs obscure portions of the video media in accordance with the guidelines (350). For example, in an embodiment of the present invention, the one or more programs blur portions of frames in a given video that display animal violence. In an embodiment of the present invention, the program code reviews the content of video media before displaying it, for example, on time delay, in order to determine what portions of the media should be obscured (e.g., blurred) before being displayed to the audience in the viewing area. In an embodiment of the present invention, a contextual detection program may effectively dissect the video content to determine whether illness, adult visual content, an aggressive situation with an animal, etc. is on screen at a given time. In an embodiment of the present invention, the program code may execute known programs that detect specifically images with adult visual content in order to identify this content in particular, such that it can be obscured if the guidelines dictate obscuring it. Certain embodiments of the present invention include administrative controls that enable a user with certain permissions to override the obscuring of images in the video content, based on the guidelines. For example, one such administrative control may enable an administrative user to replay a given screen without any obscuring of the images. These options may be password-protected and/or may be enables by a user pressing a specific sequence of keys on a remote control.

As discussed above, one or more programs in certain embodiments of the present invention obscure problematic content by blurring portions of images/frames displayed on a monitor. However, in order to obscure certain items in accordance with categories defined in the guidelines, one or more programs in embodiment of the present invention also mute any accompanying audio. This feature is particularly useful when the guidelines call for obscuring verbal or physical intimidation. If the intimidation-related content is verbal in nature, in order to prevent a viewer from experiencing the content, the program code mutes any audio during the intimidation event.

Blurring portions of a screen or an entire screen during an objectionable scene may not be the most user-friendly solution in all cases. For example, in certain embodiments of the present invention, when the program code determines that content that should be obscured is on a pre-defined duration, instead of blurring or otherwise obscuring the content, the program code may omit this section of the content entirely and/or play substitute content in its place. Depending upon the media, one solution may be more effective than the other. For example, when displaying streaming or pre-recorded video, the one or more programs may skip portions. When displaying content that is supplied in real-time, the program code may obscure the image and audio and place text on the screen for the duration of the objectionable content. For example, the program code may populate a "Please Stand By" text message on the screen. In an embodiment of the present invention, a content-supplier may provide substitute content, such as extended commercials, for utilization in the event that the one or more programs does not show certain sections of video media based on the guidelines. The program code could then substitute this additional content for any prolonged obscuring of the original content.

In an embodiment of the present invention, the one or more programs monitor reactions of viewers to the content and adjust user preferences dynamically (360). As aforementioned, various embodiments of the present invention include devices that monitor a viewing area, including but not limited to image capture devices. These devices may also include audio recording devices. In an embodiment of the present invention, the program code obtains data from the monitoring devices, including but not limited to video and audio data, and identifies pre-defined reactions of the viewers that indicate preferences. Based on identifying these reactions, the program code updates the user preferences. The program code may also utilize a machine learning algorithm to continuously "learn" reactions of viewers and coordinate these reactions with preferences. For example, if the program code obtains images that include Mary hiding her eyes, the program code can locate the content that Mary was viewing when she has this reaction. Provided that this content includes portions that are tagged as part of categories in the saved viewing preferences, the program code adjusts Mary's preferences to include a direction to obscure this type of content for Mary, going forward. In certain embodiments of the present invention, rather than automatically updating Mary's preferences, the program code communicates with Mary (or another individual in a viewing area 115), for example, via a smart television or a personal device belonging to Mary, to solicit a response regarding whether Mary would like the type of content to which she reacted blocked in the future.

In an embodiment of the present invention, in addition to providing altered content on a main monitor, the program code may simultaneously provide the original content on personal devices belonging to individuals in the room without preferences that require obscuring the content. The program code may verify (e.g., via biometric data) that a user is in possession of a secondary device before providing the content on that device.

Referring now to FIG. 4, a schematic of an example of a computing node, which can be a cloud computing node 10.

Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the smart television 110 (FIG. 1) and/or central knowledge base 166 (FIG. 1) can be understood as cloud computing node 10 (FIG. 4) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
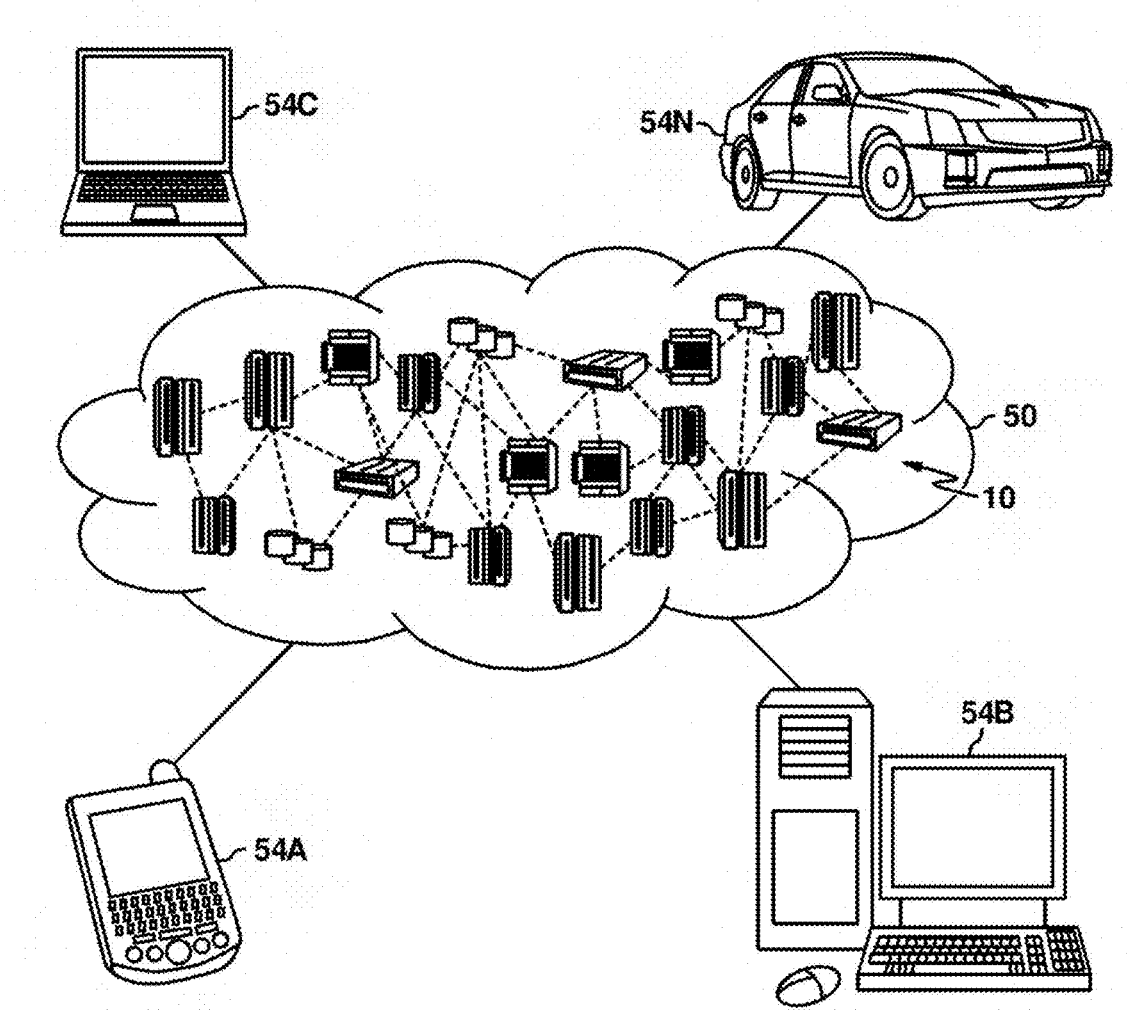
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
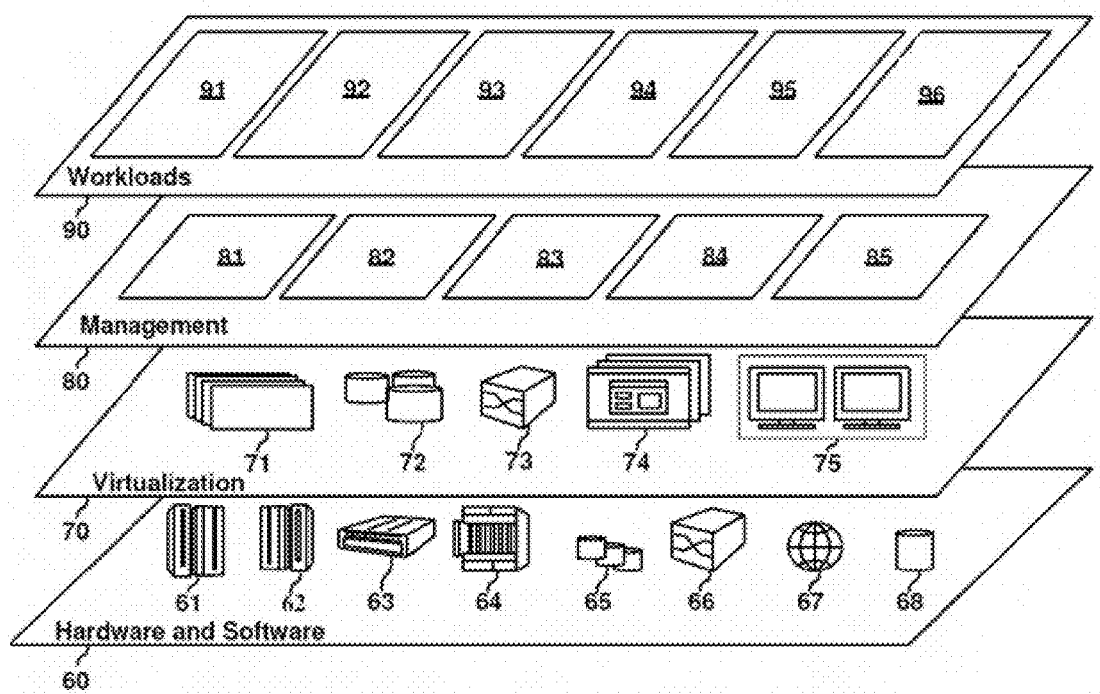
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analyzing data to determine user preferences relate to video viewing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   identifying, by one or more processors, by communicating over a communications network with one or more sensors, individuals within a designated area, wherein the designated area in within a visual range of a monitor, wherein the monitor is communicatively coupled to the one or more processors, wherein the one or more sensors comprise at least one access point configured to scan the designated area for the presence of personal computing devices, and wherein, for at least one of the individuals, the identifying comprises:
   obtaining, by the one or more processors, via the access point, a communication from a personal computing device, wherein the communication comprises a personal identifier; and identifying, by the one or more processor, the at least one of the individual, based on the personal identifier;
   obtaining, by the one or more processors, viewing preferences for each of the identified individuals, wherein the viewing preferences designate parameters for viewing media comprising content within one or more pre-defined categories, wherein at least one viewing preference of the viewing preferences is a temporary viewing preference based on an event experienced by each of the identified individuals obtained by the one or more processors, wherein the temporary viewing preference is a viewing preference in one of the pre-defined categories for a pre-defined period of time, wherein the event changes a viewing preference of the user in the one pre-defined category for the pre-defined period of time;
   consolidating, by the one or more processors, the viewing preferences of the identified individuals to generate a set of guidelines for displaying content in the designated area to all of the identified individuals, wherein the set of guidelines comprises a parameter for each of the pre-defined categories that is the narrowest parameter for a pre-defined category among the parameters for viewing media content of the identified individuals;
   analyzing, by the one or more processors, video media for display on the monitor to locate content in the pre-defined categories, wherein the video media comprises an original runtime when displayed on the monitor;
   applying, by the one or more processors, the set of guidelines to the content in the pre-defined categories and determining, based on the set of guidelines, that a first portion of the content should be obscured when the video media is displayed on the monitor, wherein at least one parameter of the set of guidelines is relevant to the first content;
   displaying, by the one or more processors, the video media on the monitor, wherein the displaying comprises:
      displaying a portion of the video media that precedes the first portion of the content on the monitor and a second portion of the content, wherein the first portion of the content and the second portion of the content comprise different areas of common video frames of the video media;
      obscuring the first portion of the content such that the first portion of the content is not viewable on the monitor, wherein during the obscuring the second portion of the content is viewable on the monitor, wherein the obscuring is for the pre-defined period of time, based on the temporary viewing preference;
      tracking time during the obscuring of the first portion of the content such that the original runtime of the video media is preserved; and
      resuming displaying, without the obscuring, a remainder of the video media, as determined based on the original runtime and expiration of the pre-defined period of time, wherein the remainder comprises a remaining portion of the video media following the first portion of the content; and
   contemporaneously with displaying the video media on the monitor, displaying, by the one or more processors, the video media on a display of the personal computing device of the at least one individual, the displaying the video media on the display of the personal computing device of the at least one individual comprising:
      determining, by the one or more processors, that the at least one parameter of the at least one individual is broader than the at least one parameter for the identified individuals; and
      displaying, on the display of the personal computing device, the video media.

2. The computer-implemented method of claim 1, wherein the obscuring further comprises muting audio associated with the content.

3. The computer-implemented method of claim 1, wherein the one or more sensors of the at least one image capture device communicatively couples to the one or more processors, wherein the image capture device is configured to capture images of individuals within the designated area, and wherein the identifying comprises:
   obtaining, by the one or more processors, images from the image capture device; and
   comparing, by the one or more processors, the images from the image capture device with stored images of prospective individuals in a memory accessible to the one or more processors; and based in the comparing, identifying, by the one or more processor, the individuals in the designated area.

4. The computer-implemented method of claim 1, further comprising:
receiving, by the one or more processors, via the access point, from the personal computing device, biometric data, wherein the biometric data indicates that the at least one individual is within a given vicinity of the personal computing device and within the designated area.

5. The computer-implemented method of claim 4, wherein the personal computing device comprises a smartwatch.

6. The computer-implemented method of claim 1, further comprising:
querying, by the one or more processors, the one or more sensors to determine whether a composition of the individuals in the designated area has changed such that at least one individual of the individuals in the designated area is a new individual;
obtaining, by the one or more processors, viewing preferences for the new individual;
updating, by the one or more processors, the set of guidelines for displaying content in the designated area based on the viewing preferences of the new individual;
analyzing, by the one or more processors, video media for display on the monitor to locate content in the pre-defined categories;
applying, by the one or more processors, the updated set of guidelines to the content in the pre-defined categories and determining, based on the updated set of guidelines, that a third portion of the content should be obscured when the video media is displayed on the monitor; and
displaying, by the one or more processors, the video media on the monitor, wherein the displaying comprises obscuring the third portion of the content such that the third portion of the content is not viewable on the monitor.

7. The computer-implemented method of claim 1, further comprising
querying, by the one or more processors, the one or more sensors to determine whether a composition of the individuals in the designated area has changed such that at least one individual formerly in the designated area is not in the designated area;
updating, by the one or more processors, the set of guidelines for displaying content in the designated area based on the viewing preferences of the identified individuals in the designated area;
analyzing, by the one or more processors, video media for display on the monitor to locate content in the pre-defined categories;
applying, by the one or more processors, the updated set of guidelines to the content in the pre-defined categories and determining, based on the updated set of guidelines, that a third portion of the content should be obscured when the video media is displayed on the monitor; and
displaying, by the one or more processors, the video media on the monitor, wherein the displaying comprises obscuring the third portion of the content such that the third portion of the content is not viewable on the monitor.

8. The computer-implemented method of claim 1, where in the obtaining viewing preferences comprises, for each identified individual:
obtaining, by the one or more processors, external data related to an identified individual, wherein the external data is located on at least one computer resource communicatively coupled to the one or more processor; and
analyzing, by the one or more processor, the external data related to the identified individual to generate, for the identified individual, the parameters for viewing media comprising the content within the one or more pre-defined categories.

9. The computer-implemented method of claim 8, wherein the external data related to the identified individual comprises historical data related to the identified individual, and wherein the analyzing comprises at least one of:
analyzing, by the one or more processors, the historical data related to the identified individual; or
performing, by the one or more processors, Natural Language Processing (NPL) on the external data.

10. The computer-implemented method of claim 1, wherein the event experienced by each of the identified individuals obtained by the one or more processors is a death in the family and the one pre-defined category is mortality.

11. A computer program product comprising:
a computer readable storage medium readable by one or more processors and storing instructions for execution by the one or more processors for performing a method comprising:
identifying, by the one or more processors, by communicating over a communications network with one or more sensors, individuals within a designated area, wherein the designated area in within a visual range of a monitor, wherein the monitor is communicatively coupled to the one or more processors, wherein the one or more sensors comprise at least one access point configured to scan the designated area for the presence of personal computing devices, and wherein, for at least one of the individuals, the identifying comprises:
obtaining, by the one or more processors, via the access point, a communication from a personal computing device, wherein the communication comprises a personal identifier; and
identifying, by the one or more processor, the at least one of the individual, based on the personal identifier;
obtaining, by the one or more processors, viewing preferences for each of the identified individuals, wherein the viewing preferences designate parameters for viewing media comprising content within one or more pre-defined categories, wherein at least one viewing preference of the viewing preferences is a temporary viewing preference based on an event experienced by each of the identified individuals obtained by the one or more processors, wherein the temporary viewing preference is a viewing preference in one of the pre-defined categories for a pre-defined period of time, wherein the event changes a viewing preference of the user in the one pre-defined category for the pre-defined period of time;
consolidating, by the one or more processors, the viewing preferences of the identified individuals to generate a set of guidelines for displaying content in the designated area to all of the identified individuals, wherein the set of guidelines comprises a parameter for each of the pre-defined categories that is the narrowest parameter for a pre-defined category among the parameters for viewing media content of the identified individuals;

analyzing, by the one or more processors, video media for display on the monitor to locate content in the pre-defined categories, wherein the video media comprises an original runtime when displayed on the monitor;

applying, by the one or more processors, the set of guidelines to the content in the pre-defined categories and determining, based on the set of guidelines, that a first portion of the content should be obscured when the video media is displayed on the monitor, wherein at least one parameter of the set of guidelines is relevant to the first content;

displaying, by the one or more processors, the video media on the monitor, wherein the displaying comprises:

displaying a portion of the video media that precedes the first portion of the content on the monitor and a second portion of the content, wherein the first portion of the content and the second portion of the content comprise different areas of common video frames of the video media;

obscuring the first portion of the content such that first portion of the content is not viewable on the monitor, wherein during the obscuring the second portion of the content is viewable on the monitor, wherein the obscuring is for the pre-defined period of time, based on the temporary viewing preference;

tracking time during the obscuring of the first portion of the content such that the original runtime of the video media is preserved; and resuming displaying, without the obscuring, a remainder of the video media, as determined based on the original runtime and expiration of the pre-defined period of time, wherein the remainder comprises a remaining portion of the video media following the first portion of the content; and contemporaneously with displaying the video media on the monitor, displaying, by the one or more processors, the video media on a display of the personal computing device of the at least one individual, the displaying the video media on the display of the personal computing device of the at least one individual comprising:

determining, by the one or more processors, that the at least one parameter of the at least one individual is broader than the at least one parameter for the identified individuals; and displaying, on the display of the personal computing device, the video media.

12. The computer program product of claim 11, wherein the obscuring further comprises muting audio associated with the content.

13. The computer program product of claim 11, wherein the one or more sensors of the at least one image capture device communicatively couples to the one or more processors, wherein the image capture device is configured to capture images of individuals within the designated area, and wherein the identifying comprises:

obtaining, by the one or more processors, images from the image capture device; and comparing, by the one or more processors, the images from the image capture device with stored images of prospective individuals in a memory accessible to the one or more processors; and based in the comparing, identifying, by the one or more processor, the individuals in the designated area.

14. The computer program product of claim 1, further comprising:

receiving, by the one or more processors, via the access point, from the personal computing device, biometric data, wherein the biometric data indicates that the at least one individual is within a given vicinity of the personal computing device and within the designated area.

15. The computer program product of claim 14, wherein the personal computing device comprises a smartwatch.

16. The computer program product of claim 11, the method further comprising:

querying, by the one or more processors, the one or more sensors to determine whether a composition of the individuals in the designated area has changed such that at least one individual of the individuals in the designated area is a new individual;

obtaining, by the one or more processors, viewing preferences for the new individual;

updating, by the one or more processors, the set of guidelines for displaying content in the designated area based on the viewing preferences of the new individual;

analyzing, by the one or more processors, video media for display on the monitor to locate content in the pre-defined categories;

applying, by the one or more processors, the updated set of guidelines to the content in the pre-defined categories and determining, based on the updated set of guidelines, that a third portion of the content should be obscured when the video media is displayed on the monitor; and displaying, by the one or more processors, the video media on the monitor, wherein the displaying comprises obscuring the third portion of the content such that the third portion of the content is not viewable on the monitor.

17. The computer program product of claim 11, the method further comprising querying, by the one or more processors, the one or more sensors to determine whether a composition of the individuals in the designated area has changed such that at least one individual formerly in the designated area is not in the designated area;

updating, by the one or more processors, the set of guidelines for displaying content in the designated area based on the viewing preferences of the identified individuals in the designated area;

analyzing, by the one or more processors, video media for display on the monitor to locate content in the pre-defined categories;

applying, by the one or more processors, the updated set of guidelines to the content in the pre-defined categories and determining, based on the updated set of guidelines, that a third portion of the content should be obscured when the video media is displayed on the monitor; and displaying, by the one or more processors, the video media on the monitor, wherein the displaying comprises obscuring the third portion of the content such that the third portion of the content is not viewable on the monitor.

18. The computer program product of claim 11, wherein the obtaining viewing preferences comprises, for each identified individual:
  obtaining, by the one or more processors, external data related to an identified individual, wherein the external data is located on at least one computer resource communicatively coupled to the one or more processor; and
  analyzing, by the one or more processor, the external data related to the identified individual to generate, for the identified individual, the parameters for viewing media comprising the content within the one or more pre-defined categories.

19. A system comprising:
a memory;
one or more processors in communication with the memory; and
program instructions executable by the one or more processors via the memory to perform a method, the method comprising:
  identifying, by the one or more processors, by communicating over a communications network with one or more sensors, individuals within a designated area, wherein the designated area in within a visual range of a monitor, wherein the monitor is communicatively coupled to the one or more processors, wherein the one or more sensors comprise at least one access point configured to scan the designated area for the presence of personal computing devices, and wherein, for at least one of the individuals, the identifying comprises:
    obtaining, by the one or more processors, via the access point, a communication from a personal computing device, wherein the communication comprises a personal identifier; and
    identifying, by the one or more processor, the at least one of the individual, based on the personal identifier;
  obtaining, by the one or more processors, viewing preferences for each of the identified individuals, wherein the viewing preferences designate parameters for viewing media comprising content within one or more pre-defined categories, wherein at least one viewing preference of the viewing preferences is a temporary viewing preference based on an event experienced by each of the identified individuals obtained by the one or more processors, wherein the temporary viewing preference is a viewing preference in one of the pre-defined categories for a pre-defined period of time, wherein the event changes a viewing preference of the user in the one pre-defined category for the pre-defined period of time;
  consolidating, by the one or more processors, the viewing preferences of the identified individuals to generate a set of guidelines for displaying content in the designated area to all of the identified individuals, wherein the set of guidelines comprises a parameter for each of the pre-defined categories that is the narrowest parameter for a pre-defined category among the parameters for viewing media content of the identified individuals;
  analyzing, by the one or more processors, video media for display on the monitor to locate content in the pre-defined categories, wherein the video media comprises an original runtime when displayed on the monitor;
  applying, by the one or more processors, the set of guidelines to the content in the pre-defined categories and determining, based on the set of guidelines, that a first portion of the content should be obscured when the video media is displayed on the monitor, wherein at least one parameter of the set of guidelines is relevant to the first content;
  displaying, by the one or more processors, the video media on the monitor, wherein the displaying comprises:
    displaying a portion of the video media that precedes the first portion of the content on the monitor and a second portion of the content, wherein the first portion of the content and the second portion of the content comprise different areas of common video frames of the video media;
    obscuring the first portion of the content such that the first portion of the content is not viewable on the monitor, wherein during the obscuring the second portion of the content is viewable on the monitor, wherein the obscuring is for the pre-defined period of time, based on the temporary viewing preference;
    tracking time during the obscuring of the first portion of the content such that the original runtime of the video media is preserved; and
    resuming displaying, without the obscuring, a remainder of the video media, as determined based on the original runtime and expiration of the pre-defined period of time, wherein the remainder comprises a remaining portion of the video media following the first portion of the content; and
  contemporaneously with displaying the video media on the monitor, displaying, by the one or more processors, the video media on a display of the personal computing device of the at least one individual, the displaying the video media on the display of the personal computing device of the at least one individual comprising:
    determining, by the one or more processors, that the at least one parameter of the at least one individual is broader than the at least one parameter for the identified individuals; and
    displaying, on the display of the personal computing device, the video media.

* * * * *